US011590438B2

(12) United States Patent
Yoo et al.

(10) Patent No.: US 11,590,438 B2
(45) Date of Patent: Feb. 28, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 633 days.

(21) Appl. No.: 16/569,908

(22) Filed: Sep. 13, 2019

(65) Prior Publication Data

US 2020/0086245 A1 Mar. 19, 2020

Related U.S. Application Data

(60) Provisional application No. 62/733,393, filed on Sep. 19, 2018.

(30) Foreign Application Priority Data

Oct. 17, 2018 (KR) .......................... 10-2018-0123553
Oct. 31, 2018 (KR) .......................... 10-2018-0131405

(51) Int. Cl.
*B01D 35/027* (2006.01)
*A01K 7/00* (2006.01)
*A01K 7/02* (2006.01)

(52) U.S. Cl.
CPC .............. *B01D 35/027* (2013.01); *A01K 7/00* (2013.01); *A01K 7/02* (2013.01)

(58) Field of Classification Search
CPC .......... B01D 35/027; A01K 7/00; A01K 7/02; A01K 7/025
(Continued)

(56) References Cited

U.S. PATENT DOCUMENTS 1,243,126 A 10/1917 Ziener
1,512,629 A 10/1924 Mueller et al.
(Continued)

FOREIGN PATENT DOCUMENTS

CA 2082083 5/1994
CA 2587229 5/2006
(Continued)

OTHER PUBLICATIONS

Dong, CN108464253A Machine Translation Description, Aug. 31, 2018, obtained Jan. 13, 2022 (Year: 2018).
(Continued)

*Primary Examiner* — Brady W Frazier
*Assistant Examiner* — Zoe Tam Tran
(74) *Attorney, Agent, or Firm* — KED & Associates, LLP

(57) ABSTRACT

A pet water dispenser may include a water tank, a pump installed inside the water tank, a water supply pipe connected to the pump to transfer water, and a water supply plate provided at a position higher than an upper end of the water tank and through which water supplied from the water supply pipe flows. The water supply plate may be provided to be spaced apart and above a water guide configured to catch water falling from an edge of the water supply plate and to guide the dropped water back into the water tank.

20 Claims, 14 Drawing Sheets

(58) Field of Classification Search
USPC .......................................................... 119/74
See application file for complete search history.

(56) References Cited

U.S. PATENT DOCUMENTS

| | | | |
|---|---|---|---|
| 2,103,653 A | 12/1937 | Weil | |
| 2,510,446 A | 6/1950 | Weil | |
| 3,076,435 A * | 2/1963 | Seymour | A01K 7/005 |
| | | | 119/61.54 |
| 3,303,824 A | 2/1967 | Anderson | |
| 3,441,003 A * | 4/1969 | Lister | A01K 5/0114 |
| | | | 43/121 |
| D221,755 S | 9/1971 | Johnson | |
| 3,691,787 A | 9/1972 | Kaufmann | |
| 3,765,614 A | 10/1973 | Bartl et al. | |
| 4,100,885 A | 7/1978 | Kapplinger | |
| 4,133,456 A | 1/1979 | Corini | |
| 4,286,546 A | 9/1981 | Moore | |
| 4,561,384 A | 12/1985 | Liff | |
| 4,640,226 A | 2/1987 | Liff | |
| 4,932,561 A | 6/1990 | Boxall | |
| 5,031,689 A | 7/1991 | Jones et al. | |
| 5,105,771 A | 4/1992 | Schafer | |
| 5,140,134 A | 8/1992 | Reusche et al. | |
| 5,174,245 A | 12/1992 | Bishop | |
| 5,205,242 A * | 4/1993 | Kasselman | A01K 5/0142 |
| | | | 119/61.53 |
| 5,209,069 A | 5/1993 | Newnan | |
| 5,345,063 A | 9/1994 | Reusche et al. | |
| 5,601,199 A | 2/1997 | Marty | |
| 5,699,669 A | 12/1997 | Gebhard | |
| 5,791,287 A * | 8/1998 | Gruber | A01K 7/005 |
| | | | 119/61.54 |
| 5,799,609 A | 9/1998 | Burns et al. | |
| 5,845,605 A * | 12/1998 | Malamphy | A01K 45/002 |
| | | | 119/69.5 |
| 5,884,582 A | 3/1999 | Duckworth | |
| 6,230,653 B1 | 5/2001 | Tobin | |
| 6,460,483 B1 | 10/2002 | Northrop et al. | |
| 6,622,657 B2 | 9/2003 | Northrop et al. | |
| 6,705,540 B2 | 3/2004 | Koshiyama et al. | |
| 6,848,392 B1 | 2/2005 | Kreutzer, Jr. | |
| 7,089,881 B2 | 8/2006 | Plante | |
| 7,270,082 B2 | 9/2007 | Plante | |
| 7,549,395 B2 | 6/2009 | Stenberg | |
| 7,600,486 B2 | 10/2009 | Ellis | |
| 7,743,698 B2 | 6/2010 | Muir et al. | |
| 7,823,538 B1 | 11/2010 | Merager | |
| 8,117,991 B1 | 2/2012 | Civitillo | |
| 8,210,447 B2 | 7/2012 | Cohen | |
| 8,387,566 B2 | 3/2013 | Graves et al. | |
| 8,770,147 B2 | 7/2014 | Rowe | |
| 8,770,148 B2 | 7/2014 | Lipscomb et al. | |
| 9,035,222 B2 | 5/2015 | Alexander | |
| D738,579 S | 9/2015 | Owens et al. | |
| D755,449 S | 5/2016 | Cornwell, Jr. et al. | |
| 9,497,930 B2 | 11/2016 | Lipscomb et al. | |
| D819,898 S | 6/2018 | Poisson et al. | |
| 10,165,753 B1 | 1/2019 | Huang | |
| 11,154,034 B2 | 10/2021 | Youn et al. | |
| 11,160,250 B2 | 11/2021 | Yoo et al. | |
| 2002/0020673 A1 | 2/2002 | Nohren et al. | |
| 2003/0115902 A1 | 6/2003 | Busick et al. | |
| 2003/0140864 A1 | 7/2003 | Wenstrand | |
| 2003/0213437 A1 | 11/2003 | Norris | |
| 2005/0166853 A1 | 8/2005 | Plante | |
| 2006/0174838 A1 | 8/2006 | Plante | |
| 2006/0231040 A1 | 10/2006 | Bast et al. | |
| 2006/0288947 A1 | 12/2006 | Perlsweig et al. | |
| 2007/0045159 A1 | 3/2007 | Lee | |
| 2007/0095297 A1 | 5/2007 | Boyd | |
| 2007/0199512 A1 | 8/2007 | Ellis | |
| 2007/0227456 A1 | 10/2007 | Borey | |
| 2008/0078330 A1 | 4/2008 | McCallum et al. | |
| 2008/0169249 A1 | 7/2008 | Ter Stege | |
| 2008/0190374 A1 | 8/2008 | Farris | |
| 2008/0257272 A1 | 10/2008 | Bolda | |
| 2009/0126641 A1 | 5/2009 | Anderson et al. | |
| 2009/0218985 A1 | 9/2009 | Hallett | |
| 2010/0095897 A1 | 4/2010 | Rowe | |
| 2010/0276508 A1 | 11/2010 | Davies | |
| 2010/0300366 A1 | 12/2010 | Lipscomb et al. | |
| 2011/0067638 A1 | 3/2011 | Lipscomb et al. | |
| 2011/0102945 A1 | 5/2011 | Isono et al. | |
| 2011/0214613 A1 | 9/2011 | Diamond | |
| 2011/0226470 A1 | 9/2011 | Latrille et al. | |
| 2011/0259273 A1 | 10/2011 | Lipscomb et al. | |
| 2012/0017839 A1 | 1/2012 | Veness et al. | |
| 2012/0111280 A1 | 5/2012 | Shin et al. | |
| 2012/0216751 A1 | 8/2012 | Rowe | |
| 2013/0087102 A1 | 4/2013 | Lipscomb et al. | |
| 2013/0092090 A1 | 4/2013 | McCallum | |
| 2013/0175802 A1 | 7/2013 | Breau et al. | |
| 2013/0192529 A1 | 8/2013 | Kruger et al. | |
| 2013/0200064 A1 | 8/2013 | Alexander | |
| 2013/0228132 A1 | 9/2013 | Lipscomb et al. | |
| 2013/0255280 A1 | 10/2013 | Murphy et al. | |
| 2014/0033984 A1 | 2/2014 | Li et al. | |
| 2014/0053781 A1 | 2/2014 | Lewis | |
| 2014/0076242 A1 | 3/2014 | Ho | |
| 2014/0165607 A1 | 6/2014 | Alexander | |
| 2014/0251223 A1 | 9/2014 | Rowe et al. | |
| 2014/0353335 A1 | 12/2014 | Van Diepen | |
| 2015/0135728 A1 | 5/2015 | Swanson et al. | |
| 2015/0189862 A1 | 7/2015 | Lipscomb | |
| 2015/0196157 A1 | 7/2015 | Swisth | |
| 2015/0276204 A1 | 10/2015 | Ray | |
| 2015/0313180 A1 | 11/2015 | Lipscomb et al. | |
| 2015/0353335 A1 | 12/2015 | Breault | |
| 2016/0000037 A1 | 1/2016 | Lipscomb et al. | |
| 2016/0099599 A1 | 4/2016 | Ho et al. | |
| 2016/0113249 A1 | 4/2016 | Kuo | |
| 2016/0118179 A1 | 4/2016 | Park et al. | |
| 2016/0159633 A1 | 6/2016 | Diffenderfer | |
| 2016/0286757 A1 | 10/2016 | Armstrong | |
| 2016/0287363 A1 | 10/2016 | Miller | |
| 2017/0245465 A1 | 8/2017 | Oates et al. | |
| 2017/0255186 A1 | 9/2017 | Ryznar et al. | |
| 2018/0054073 A1 | 2/2018 | Olson et al. | |
| 2018/0160648 A1 | 6/2018 | Goh | |
| 2018/0177325 A1 | 6/2018 | Lyons et al. | |
| 2019/0075755 A1 | 3/2019 | Imaizumi et al. | |
| 2019/0140471 A1 | 5/2019 | Johanski et al. | |
| 2019/0162460 A1 | 5/2019 | Oh | |
| 2019/0227580 A1 | 7/2019 | von der Assen et al. | |
| 2019/0239476 A1 * | 8/2019 | Mai | A01K 7/02 |
| 2019/0239491 A1 | 8/2019 | Yu et al. | |
| 2019/0357747 A1 | 11/2019 | Keiler, III | |
| 2020/0303971 A1 | 9/2020 | Hall et al. | |
| 2020/0337266 A1 | 10/2020 | Yu et al. | |
| 2020/0355751 A1 | 11/2020 | Swaans et al. | |

FOREIGN PATENT DOCUMENTS

| | | |
|---|---|---|
| CH | 711714 | 1/2022 |
| CN | 2322412 | 6/1999 |
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |

(56) References Cited

FOREIGN PATENT DOCUMENTS

| | | |
|---|---|---|
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 203618522 U * | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109997713 | 7/2019 |
| DE | 20 2016 107 252 | 3/2018 |
| EP | 0 894 430 | 2/1999 |
| EP | 1188 995 | 3/2002 |
| EP | 1 566 099 | 8/2005 |
| EP | 3 315 022 | 5/2018 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1825334 | 2/2018 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

United States Office Action dated Mar. 14, 2022 issued in co-pending related U.S. Appl. No. 16/570,310.
United States Office Action dated Mar. 17, 2022 issued in co-pending related U.S. Appl. No. 16/574,581.
Chinese Office Action dated Mar. 30, 2021 issued in CN Application No. 201910886714.X.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
United States Office Action dated Mar. 24, 2022 issued in co-pending related U.S. Appl. No. 16/571,089.
United States Office Action dated Oct. 5, 2021 issued in co-pending related U.S. Appl. No. 16/571,074.
United States Office Action dated Dec. 6, 2021 issued in co-pending related U.S. Appl. No. 16/569,827.
United States Office Action dated Dec. 10, 2021 issued in co-pending related U.S. Appl. No. 16/571,075.
European Search Report dated Feb. 27, 2020 issued in Application No. 19198292.5.
European Search Report dated Feb. 27, 2020 issued in Application No. 19198298.2.
Chinese Office Action dated May 17, 2021 issued in CN Application No. 201910889361.9.
Chinese Office Action dated May 10, 2021 issued in CN Application No. 201910888718.1.
European Search Report dated Feb. 24, 2020 issued in EP Application No. 19198289.1.
Chinese Office Action dated Mar. 31, 2021 issued in CN Application No. 201910886533.7.
United States Office Action dated Feb. 1, 2022 issued in co-pending related U.S. Appl. No. 16/574,237.
European Search Report dated Apr. 23, 2020 issued in EP Application No. 19198303.0.
European Search Report dated Feb. 3, 2020 issued in EP Application No. 19198170.3.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.

(56) References Cited

OTHER PUBLICATIONS

European Search Report dated Feb. 19, 2020 issued in Application No. 19198200.8.
United States Office Action dated May 11, 2021 issued in co-pending related U.S. Appl. No. 16/571,093.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
United States Office Action dated Mar. 30, 2021 issued in co-pending related U.S. Appl. No. 16/571,090.
United States Office Action dated Feb. 11, 2022 issued in co-pending related U.S. Appl. No. 16/574,322.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
Chinese Office Action dated Nov. 10, 2021 issued in CN Application No. 201910886533.7.
Chinese Office Action dated Nov. 10, 2021 issued in CN Application No. 201910886714.X.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
Chinese Office Action dated May 21, 2021 issued in CN Application No. 201910888661.5.
Chinese Office Action dated Apr. 1, 2021 issued in CN Application No. 201910886305.X.
Chinese Office Action dated Apr. 9, 2021 issued in CN Application No. 201910886526.7.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
United States Office Action dated Sep. 19, 2022 issued in co-pending related U.S. Appl. No. 16/569,827.
Chinese Notice of Allowance dated Jul. 11, 2022 issued in CN Application No. 201910886305.X.
United States Office Action dated Aug. 29, 2022 issued in co-pending related U.S. Appl. No. 16/571,245.
United States Office Action dated Jun. 23, 2022 issued in co-pending related U.S. Appl. No. 16/574,368.
United States Office Action dated Jul. 5, 2022 issued in co-pending related U.S. Appl. No. 16/574,240.
United States Office Action dated Jul. 7, 2022 issued in co-pending related U.S. Appl. No. 16/574,474.
United States Office Action dated Jul. 29, 2022 issued in co-pending related U.S. Appl. No. 16/574,322.
United States Office Action dated May 19, 2022 issued in co-pending related U.S. Appl. No. 16/569,827.
United States Office Action dated Jun. 1, 2022 issued in co-pending related U.S. Appl. No. 16/571,075.
United States Office Action dated Jun. 2, 2022 issued in co-pending related U.S. Appl. No. 16/570,279.
Chinese Notice of Allowance dated Apr. 8, 2022 issued in CN Application No. 201910888611.7.
European Search Report dated Apr. 9, 2020 issued in EP Application No. 19198174.5.
United States Office Action dated Jun. 2, 2020 issued in co-pending related U.S. Appl. No. 16/574,259.
Chinese Notice of Allowance dated Aug. 31, 2022 issued in CN Application No. 201910889318.2
Chinese Office Action dated Sep. 21, 2022 issued in CN Application No. 201910888224.3
United States Office Action dated Oct. 11, 2022 issued in co-pending related U.S. Appl. No. 16/570,279.
United States Office Action dated Oct. 13, 2022 issued in co-pending related U.S. Appl. No. 16/571,089.

* cited by examiner

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application Nos. 10-2018-0123553 filed on Oct. 17, 2018 and 10-2018-0131405 filed on Oct. 31, 2018, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest pets. Like most animals, pets must drink water to survive and maintain a biorhythm. Since pets are often left alone and since communication with their human owners is difficult, the demand for pet water dispensers or water supply devices has increased.

US 2015/0313180 A1, US 2010/0095897 A, US 201710245465A1, and EP 3315022 A1 (hereinafter referred to as "related art") disclose drinking bowls for pets. However, such drinking bowls have various disadvantages, which the present disclosure solves.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
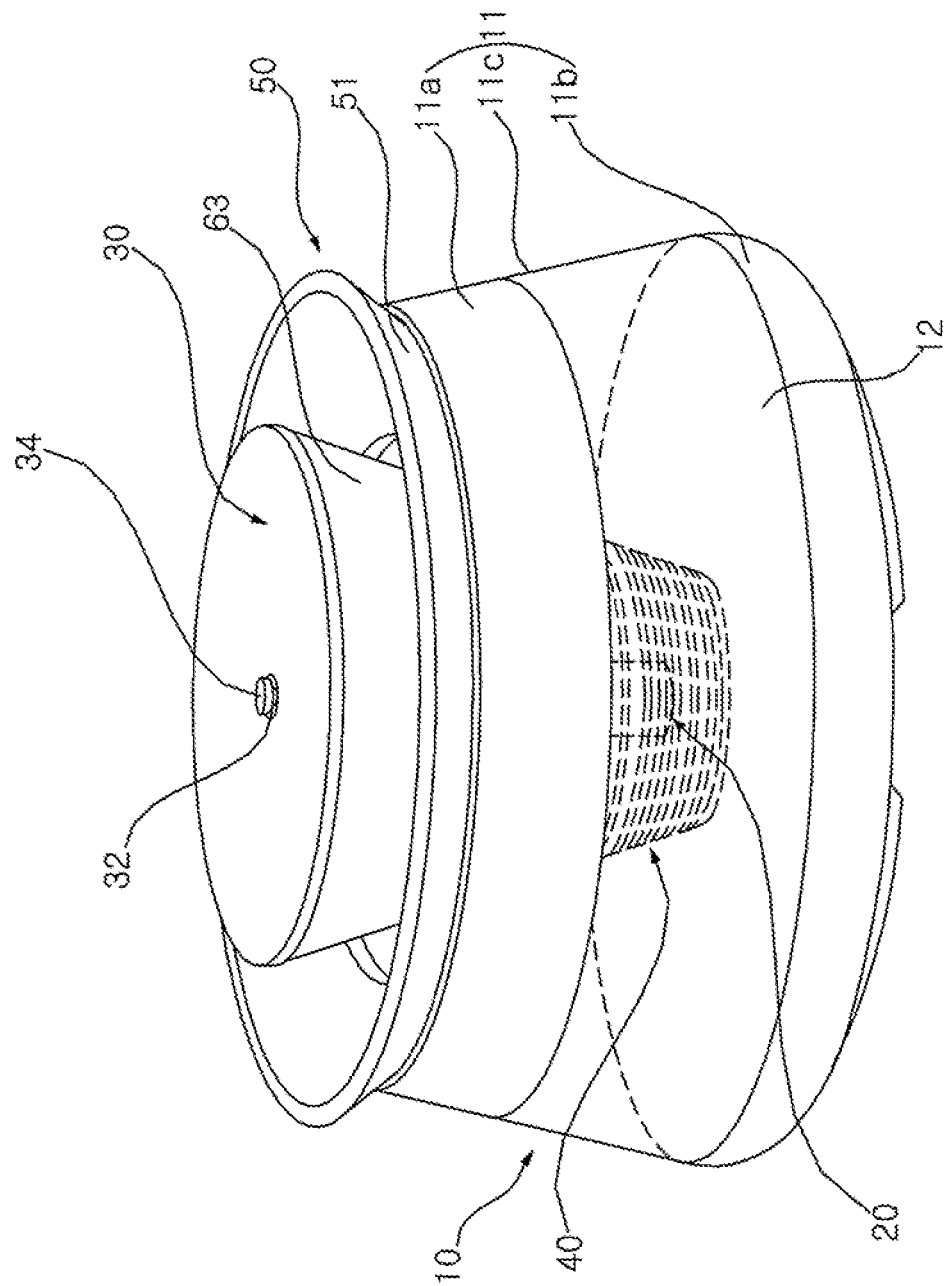
FIG. 1 is a perspective view showing a pet water dispenser according to an embodiment.
Figure 2:
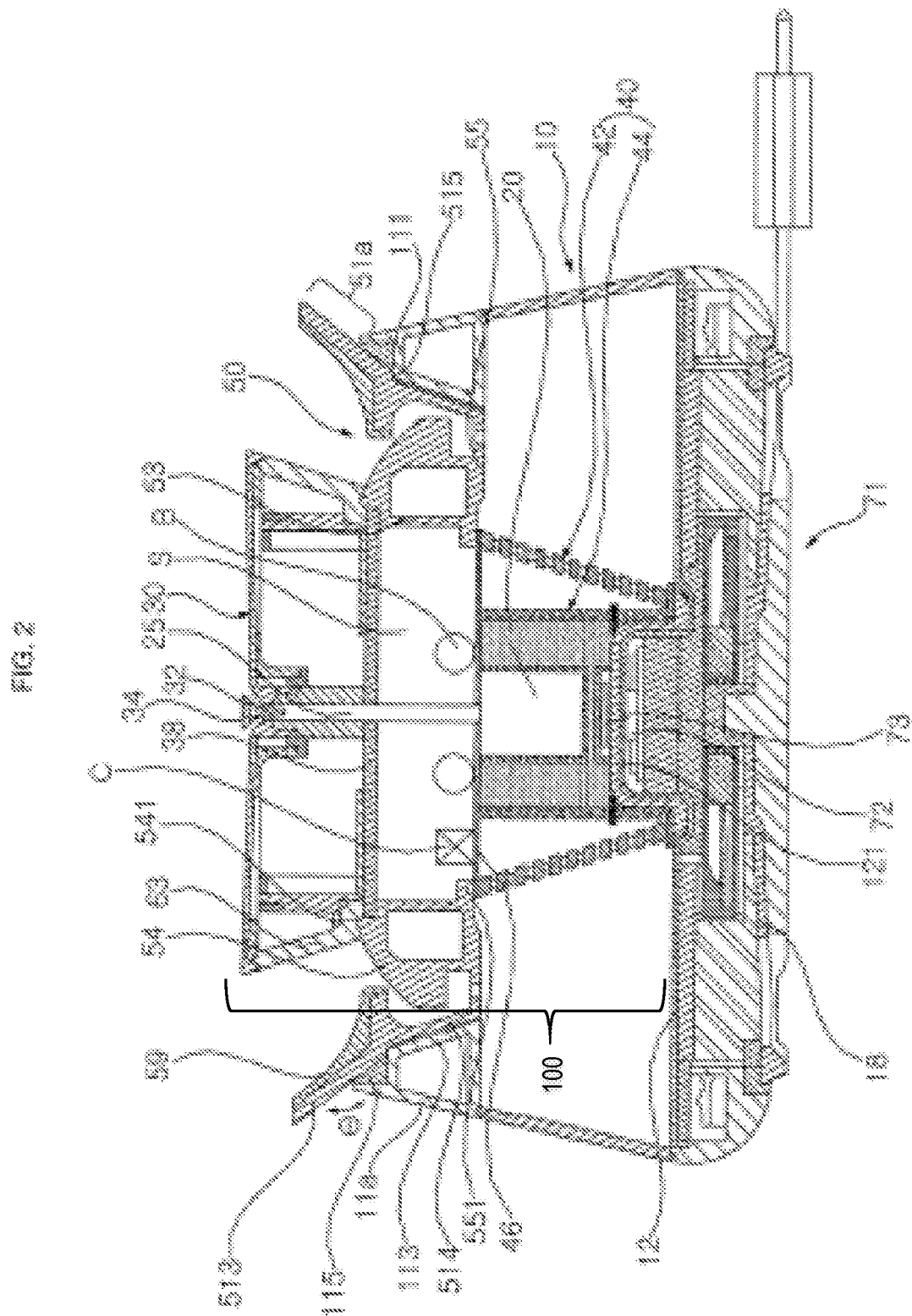
FIG. 2 is a cross-sectional view of a pet water dispenser according to a first embodiment.

Referring to FIGS. 1 and 2, a liquid dispenser, e.g., a pet water dispenser, according to an embodiment may include a water tank 10 having an upper opening defined by a wall, a pump 20 installed or located in the water tank or storage chamber 10 to pump water or liquid in the water tank 10, a water supply pipe 25 through which water discharged from the pump 20 flows, a water supply plate or an upper plate 30 provided at a higher position than the wall of the water tank 10 and over which water supplied from the water supply pipe 25 flows, and a water guide 50 provided to be below and spaced apart from the water supply plate 30 to receive the water dropped from the water supply plate 30 and to guide water back into the water tank 10.

A filter assembly 40 may be provided in the water tank 10 to filter foreign substances contained in the water before the water stored in the water tank 10 flows into the pump 20. The pet water dispenser according to an embodiment may further include a power supply device or assembly, a lighting device or warning light, a water level sensor or weight sensor, a water temperature sensor, a proximity sensor, a pollution level or contamination sensor, a cooling or heating assembly and/or a thermoelectric element, and a sterilizing filter (e.g., ultraviolet light emitting diode). Details of these devices are found in U.S. application Ser. No. 16/659,841 filed on Sep. 13, 2019, the entire contents of which are incorporated by reference herein.

Figure 3:
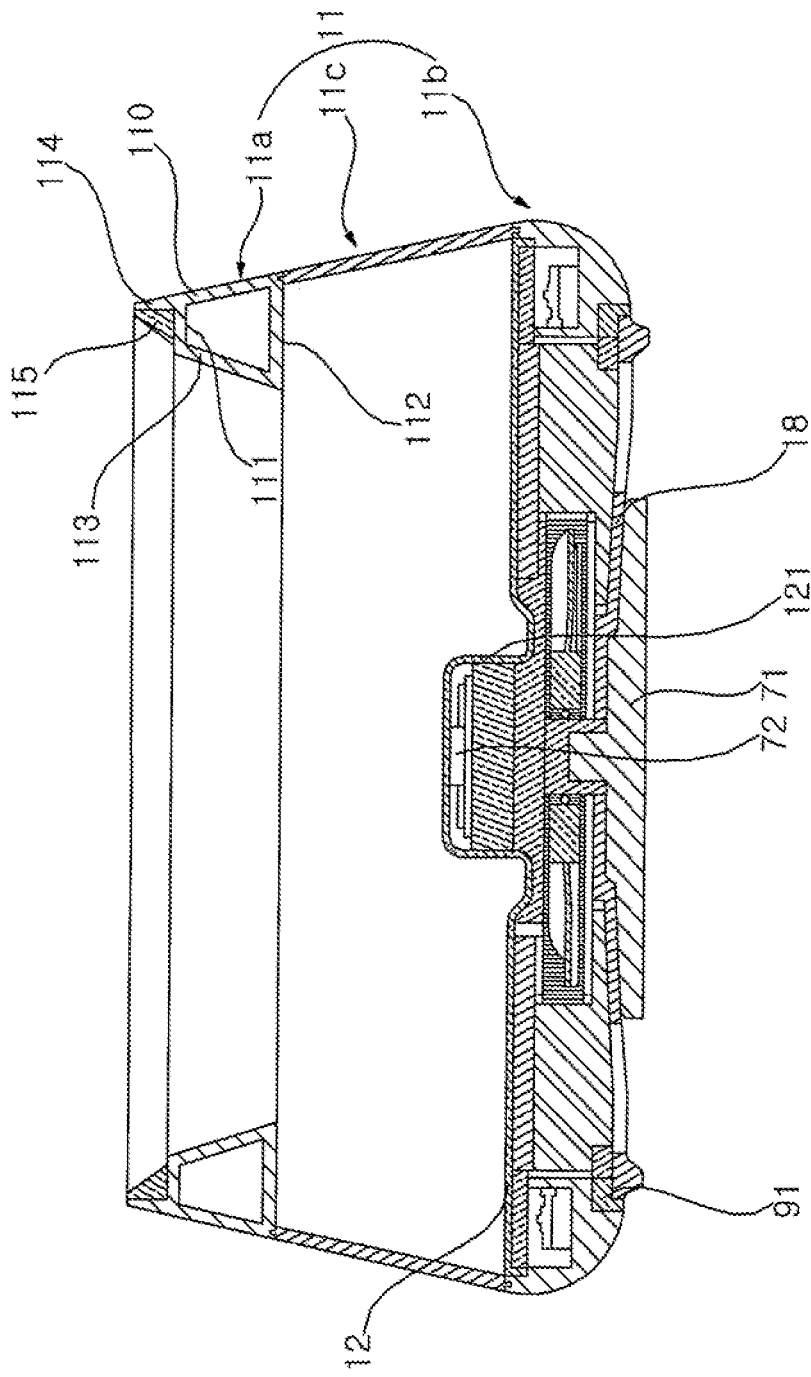
FIG. 3 is a cross-sectional view of a water tank included in an embodiment.

Referring to FIGS. 1 to 3, the water tank 10 may include a wall 11 having forming a side of the water tank 10 and a bottom plate 12 defining a bottom of a storage chamber or container of the water tank 10.

The wall 11 may include a main wall 11c and an upper wall 11a. The main wall 11c may be provided above the bottom plate 12, and the upper wall 11a may extend from a top end of the main wall 11c. The main wall 11c, upper wall 11a, and bottom plate 12 may define the container of the water tank 10 in which water is stored, while a container support or base 11b may be coupled to a bottom end of the main wall 11c and provided below the bottom plate 12. The container support 11b may not store water, and instead may house various electronic devices described later. The container support 11b may alternatively be referred to as a base 11b.

The main wall 11c, the upper wall 11a, and the container support 11b may be separately manufactured and then later combined for integration, or may be integrally manufactured. The container of the water tank 10 may be formed in a truncated cone or trapezoidal shape such that the upper and main walls 11a and 11c are inclined inward from bottom ends to top ends. However, the container of the water tank 10 may be formed in various shapes without being limited to the above-mentioned truncated cone shape. As an example, the container of the water tank 10 may be cylindrical. However, when the water tank 10 is formed in a truncated cone shape as described above, the water tank 10 may be stably positioned and may not be easily overturned due to a lower center of gravity.

The upper wall 11a may include a first protruding plate 111 and a second protruding plate 112 protruding horizontally inward from an inner surface of the upper wall 11a toward a center of the water tank 10. The first and second protruding plates 111 and 112 may be spaced apart from each other in a vertical direction. An inner tank wall or inner inclined surface 113 may extend between inner ends of the first and second protruding plates 111 and 112. Lengths and positions of the first and second protruding plates 111 and 112 may be configured such that the inner tank wall 113 is inclined. The first protruding plate 111 may be provided above the second protruding plate 112 and may have a shorter length than a length of the second protruding plate. The inner tank wall 113 may be inclined outward from a bottom end to a top end. The bottom end of the inner tank wall 113 may be coupled to the inner end of the second protruding plate 112, while the top end of the inner tank wall 113 may be coupled to the inner end of the first protruding plate 111.

The upper wall 11a may be formed with an extension 114 protruding upward from an outer end of the first protrusion 111. A bumper 115 may be attached to an inner surface of the extension 114 and/or an upper surface of the first protruding plate 111. The bumper 115 may be made of an elastic material (e.g., rubber) and may therefore also be referred to as packing or cushioning. The water guide 50 described later may be placed on the upper wall 11a so that an upper inclined surface 513 of the water guide 50 may be in close contact with the packing 115.

A protrusion 121 having a cylindrical shell shape may be formed to protrude upward from a center of the bottom plate 12, and a first wireless power transfer device 72 (e.g., a wireless power transmitter and/or a transceiver) may be provided in an inner space of the protrusion 121 below the bottom plate 12. The bottom plate 12 may be provided on top of the container support 11b, while a base plate 18 may be provided below and coupled to a bottom of the container support 11b. An inner space of the base of the water tank 10 may be defined by the container support 11b at sides, the bottom plate 12 on top, and the base plate 18 on bottom. The base plate 18 may be placed on and electrically connected to a docking station 71 to which external power is applied.

Referring to FIG. 2, the filter assembly 40 may include a first filter 42 and a second filter 44. The first filter 42 may be a truncated (conical) strainer which is formed in a truncated cone or trapezoidal shape. A bottom end of the first filter 42 may have a diameter that is less than a diameter of the top end of the first filter 42. The first filter may be made of a rigid material (e.g., metal) and may have a plurality of water inlets or through holes formed in sidewalls.

A second filter 44 may be provided inside of the first filter 42, and the pump 20 may be provided inside an inner space of the second filter 44. The second filter 44 may include an outer or first wall having a plurality of through holes, and an inner or second wall having a plurality of through holes. A filter medium or material (e.g., carbon filter) may be provided between the first and second walls of the second filter 44, while the pump 20 may be provided inside of the second wall of the second filter 44.

A second wireless power transfer device 73 (e.g., a wireless power receiver and/or a transceiver) may be provided inside a sealed space of the second filter 44. The second wireless power transfer device 73 may receive and/or transmit wireless power from the first wireless power transfer device 72 via a wireless power transfer (WPT) method (e.g., electromagnetic induction method). The first wireless power transfer device 72 may generate a changing magnetic field, which may induce a current or voltage in the second wireless power transfer device 73.

Although the second wireless power transfer device 73 is shown as being provided within a sealed space of the second wall of the second filter 44, alternatively, the second wall of the second filter 44 may not be as long as the first wall of the second filter 44, and the second wireless power transfer device 73 may be provided within a sealed space formed within the first wall of the second filter 44. The space in which the second wireless power transfer device 73 is provided may be sealed by omitting a plurality of through holes in corresponding sections of the first and/or second walls of the second filter 44.

An upper filter cover 46 through which the water supply pipe 25 passes may be provided on top ends of the first and second filters 42 and 44 so that an upper portion of the pump 20 and the first and second filters 42 and 44 are covered and/or closed. The water supply pipe 25 may be arranged in the vertical direction so that the water discharged from the pump 20 may be transported upward and then discharged through a water supply hole 32 of the water supply plate 30.

Figure 4:
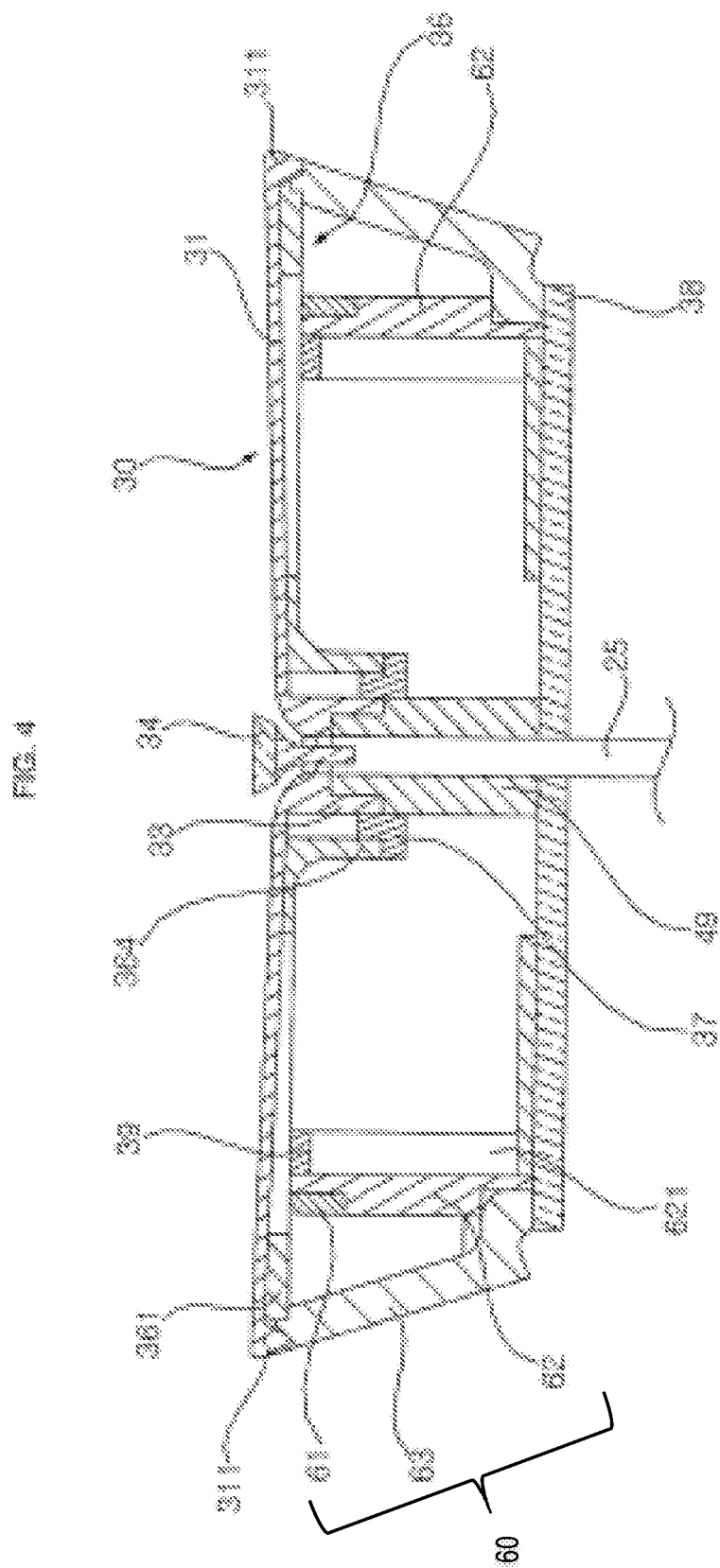
FIG. 4 is a perspective view showing a water supply plate and an illumination assembly included in an embodiment.

Referring to FIG. 4, the water supply plate 30 may have a smooth upper surface 31 over which water cascades and/or flows. The water supply hole 32 may be formed at a center of the water supply plate 30, and a first boss 33 may extend from a bottom surface of the water supply plate 30. The first boss 33 may have a hole or opening that communicates with the water supply hole 32.

Although the water supply plate 30 is shown in the figures to have a disk shape, it may be formed in various other shapes. For example, the water supply plate 30 may have a hexagon shape with six vertices. The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

The upper surface 31 of the water supply plate 30 may be formed as a smooth surface inclined upward toward an edge 311. The water supply hole 32 may be formed to have a trumpet shape such that a diameter of the water supply hole 32 gradually increases in an upward direction toward the upper surface 31 of the water supply plate 30.

A float or nozzle stopper 34 may be at least partially inserted into the water supply hole 32. The float 34 may serve as a diverter. A ring-shaped discharge port or hole may be formed between the float 34 and a portion of the water supply hole 30 that defines the water supply hole 32. Water discharged from a water outlet of the water supply pipe 25 through the ring-shaped discharge port may be sprayed in a ring shape through the discharge port and cascade across the upper surface 31 of the water supply plate 30 toward the edge 33. The water may fall vertically from the edge 311 toward the water guide 50 described later.

The float 34 may have a stem and a head. The stem of the float 34 may be configured to be inserted into the water supply hole 32, while the head of the float 34 may have a size that cannot be inserted into the water supply hole 32. The stem of the float 34 may include ribs to fix the stem within the water supply hole 32. Alternatively, the ribs of the stem of the float 34 may be captured within grooves formed on an inner surface of the water supply hole 32 and/or the first boss 33, and the float 34 may move up and down within the water supply hole 32 based on a pumping capacity of the pump 20. In such an alternative embodiment, the float 34 may completely close the water supply hole 32 when the pump 20 is turned off.

A plate support 36 to support the water supply plate 30 may be provided below the water supply plate 30. The plate support 36 may be supported by an illumination assembly 60 including a light base or support 62 and a support 63. The support 63 may serve as a light diffuser and may also be referred to as a light guide or light guide plate.

The first boss 33 of the water supply plate 30 may be inserted into a hole formed in a second boss 364 extending from a bottom surface of the plate support 36. A sealing ring 37 may be forcedly inserted between the first and second bosses 33 and 364. The sealing ring 37 may be made of an elastic material (e.g., rubber) and may also be referred to as a packing ring.

A sterilizing filter 49, e.g., an ultraviolet (UV) filter or light, may be provided around the water supply pipe 25 to sterilize water that passes through or is discharged from the water supply pipe 25. A top end of the sterilizing filter 49 may be higher than a top end of an outlet of the water supply pipe 25 so that light may be sterilized directly. Alternatively or in addition thereto, sterilizing filters (e.g., UV lights) may be provided on bottom ends of the first and second filters 42 and 44 to sterilize water in the water tank 10.

A reinforcing ring 39 may be provided on the bottom surface of the plate support 36. The reinforcing ring 39 may be supported by reinforcing ribs 621 provided on an inner surface of the light base 62 of the illumination assembly 60.

The illumination assembly 60 may be provided below the water supply plate 30 and the plate support 36, and may include a light emitting device or light device 61, the light base 62 on which the light device 61 is installed, and the support 63 provided on an outer side of the light base 62.

The light base 62 may be formed in a cylindrical shape, while the support 63 may be formed in a trumpet or truncated cone shape having an upper end larger than a lower end. The edge 311 of the water supply plate 30 and an edge of an outer ring 361 of the plate support 36 may be provided on the upper end of the support 63. A lower end of the support 63 may be placed on the partition plate 38. The water dropped from the edge 311 of the water supply plate 30 may drip down a side of the support 63 or may fall directly down to the water guide 50 depending on a speed of the falling water.

Referring to FIGS. 1, 2, 5, and 6, the water guide 50 may be provided below the water supply plate 30. The water guide 50 and the water supply plate 30 may together cover the upper opening of the water storage tank 10. The water failing from the edge 311 of the water tank 10 may be guided back to the water tank 10 by the water guide 50.

The water guide 50 may include an outer guide wall 51 forming an outer rim and an inner guide wall 53 forming an inner rim. A drain passage 52 may be defined between the outer guide wall 51 and the inner guide wall 53, and a bottom wall 55 may extend between bottom ends of the outer and inner guide walls 51 and 53.

The bottom wall 55 may be formed with at least one discharge hole 56 to discharge or guide the water dropped into the water guide 50 back into the water tank 10. The discharge holes 56 may include one or more circular holes, ring-shaped holes, arc-shaped holes, etc. formed along a circumferential direction of the bottom wall 55. Shapes of the discharge holes 56 are not limited to circular holes, ring-shaped holes, or arc-shaped holes, and the discharge holes 56 may have any shape configured to guide water to the water tank 10.

The inner guide wall 53 may be formed with a guide or guide surface 54 projecting from an upper surface of the inner guide wall 53 out toward the outer guide wall 51. The guide 54 may be rounded or curved so that the water dropped from the water supply plate 30 hits the guide 54 and rolls downward through the drain passage 52. Although the figures show that the guide 54 is formed on the inner guide wall 53 of the water guide 50, the guide 54 may alternatively be formed on the outer guide wall 51 to protrude toward the inner guide wall 53.

A groove 541 may be formed inside an upper portion of the guide 54, and an edge of the partition plate 38 may be positioned on the groove 541. The lower end of the support 63 may be placed on the edge of the partition plate 38, and a lower portion or protrusion of the support 63 may contact an upper end of the guide 54.

The outer guide wall 51 may have a protrusion 511 formed on an inner side or surface and protrude inward toward the guide 54. An inner surface 512 of an upper portion of the outer guide wall 51 may extend upward from the protrusion 511. The inner surface 512 may be formed as an inclined surface extending upward. A narrow gap 521 of the drain passage 52 may be formed between the protrusion 511 and the guide 54.

The inner guide wall 53 may include a first vertical wall 531 defining an inner opening of the inner guide wall 53, and a second vertical wall 532 surrounding the first vertical wall 531. The first vertical wall 531 may connect a lower side of the groove 541 to the bottom wall 55. The second vertical wall 532 may be formed between a bottom surface of the guide 54 and the bottom wall 55, and may increase a rigidity of the inner guide wall 53. The first and second vertical walls 531 and 532 may support inner and outer sides, respectively, of the guide 54.

A lower portion of the guide 54 may protrude from an upper end of the second vertical wall 532 toward the outer guide wall 51. A water retention space 521 may be formed under the lower portion of the guide 54 between the bottom wall 55 and the lower end of the guide 54. The water may be smoothly guided to an inside of the water tank 10 through the discharge hole 56 from the water retention space 521. Since the discharge hole 56 may be a relatively small through-hole to additionally filter water, water may gather in the water retention space 521 before being guided through the discharge hole 56 to the water tank 10.

A coating layer 59 made of a material different from a material of the water guide 50 may be coated on the inner surface 512 of the upper portion of the outer guide wall 51 and also on an upper surface of the protrusion 511. A material of the coating layer 59 may be configured to enhance aesthetics, so that a tactile touch may be made smooth, and to prevent falling water from scattering. The coating layer 59 may be made of a same material of the water supply plate 30 (e.g., ceramic, stainless steel, or plastic) to enhance aesthetics and facilitate cleaning.

The outer guide wall 51 may be formed to be higher than an upper surface of the guide 54 and the upper end of the upper wall 11a. A protruding portion 51a of the outer guide wall 51a may protrude outward past the extension 114 of the upper wall 11a, and a predetermined angle Θ may be formed between the protruding portion 51a and the extension 114. As an example, the predetermined angle Θ may be 120°, and may be configured so that the inner surface 512 may catch water falling from the water supply plate 30.

An outer surface of the outer guide wall 51 may have two upper and lower inclined surfaces 513 and 514 and a stepped portion 515 between the upper and lower inclined surfaces 513 and 514. The lower inclined surface 514 may be supported on the inner tank wall 113, while the upper inclined surface 513 may be supported by the extension 114 and the bumper 115 and include the protruding portion 51a of the outer guide wall 51. The step portion 515 may be placed on the first protruding plate 111 formed on the upper wall 11a so that the water guide 50 may be firmly seated on the water tank 10.

The bottom wall 55 of the water guide 50 may be formed with a protrusion or extension 551 protruding inward from the first vertical wall 531 of the inner guide wall 53. The extension 551 may be provided on an upper side of an edge of the upper filter cover 46. The extension 551 may protrude slightly upward from the bottom wall 55 so that that upper filter cover 46 may fit below the extension 551 and so that a side of an edge may fit within the bottom wall 55.

A coupling between the upper filter cover 46 and the extension 551 and between the partition plate 38 and the groove 541 may be configured to form a sealed space or chamber S where the battery B and the controller C may be installed. The space S may be defined by the upper filter cover 46 and partition plate 38 on bottom and top, respectively, and the first vertical wall 531 at a side. The extension 551 and the upper filter cover 46 may be assembled to be detachable from each other (e.g., by an arm, hook, or a screw method), or may be fixed to each other (e.g., by bonding, welding, fusion, or adhesion).

Figure 5:
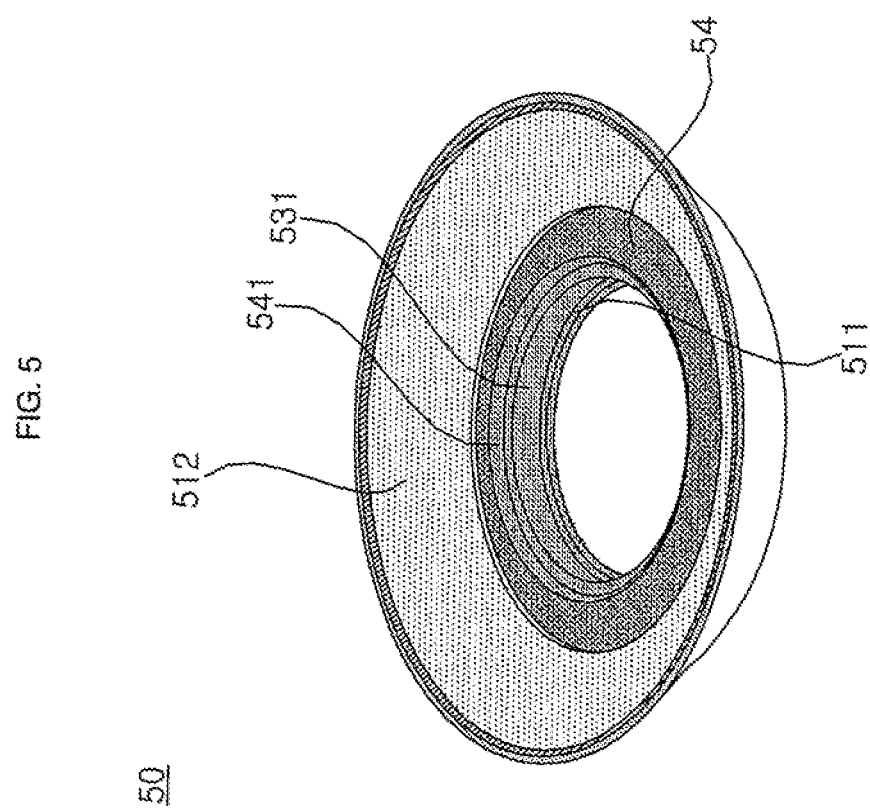
FIG. 5 is a perspective view showing a water guide included in the first embodiment.
Figure 6:
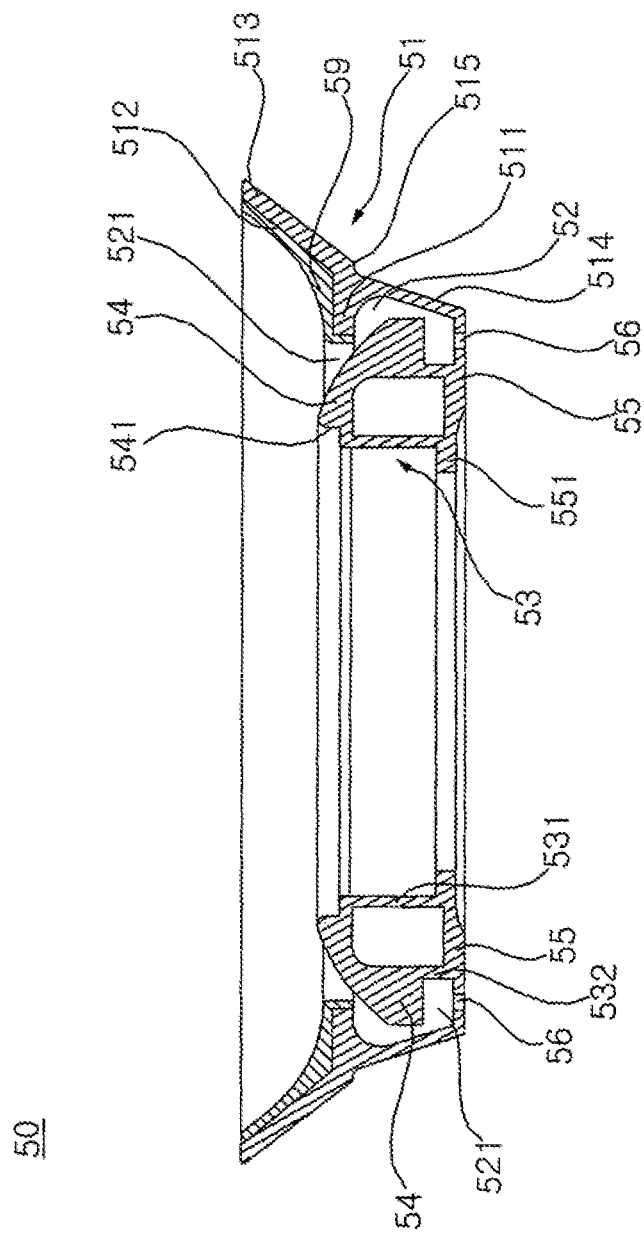
FIG. 6 is a cross-sectional view of FIG. 5.
Figure 7:
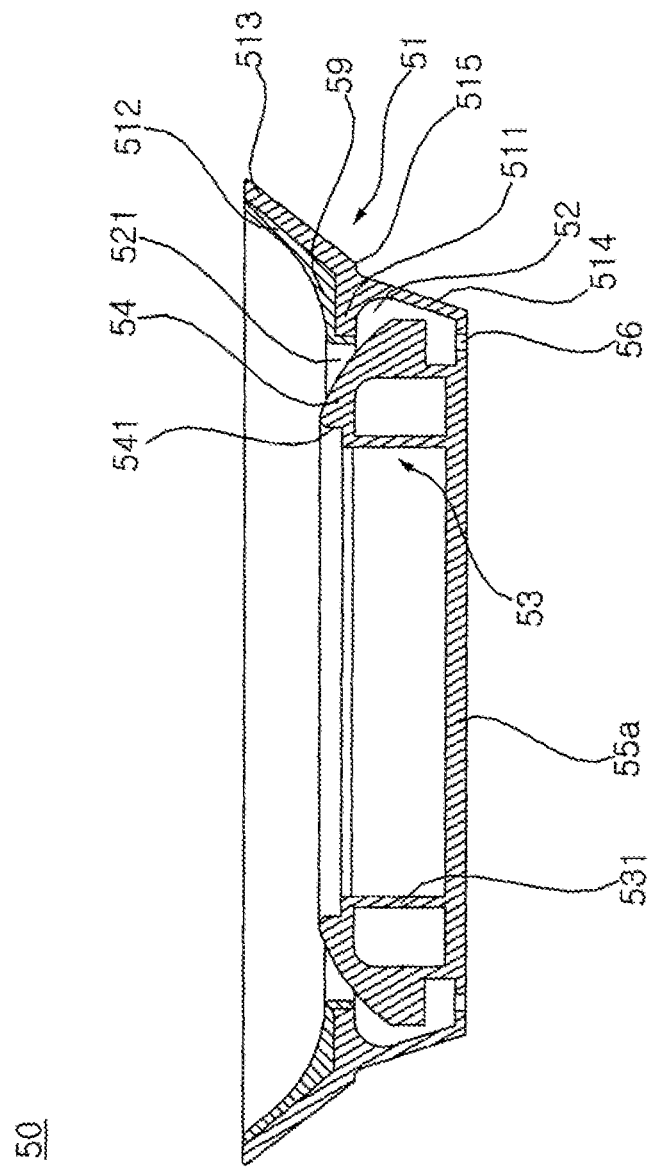
FIG. 7 is a cross-sectional view of a water guide according to a second embodiment.
Figure 8:
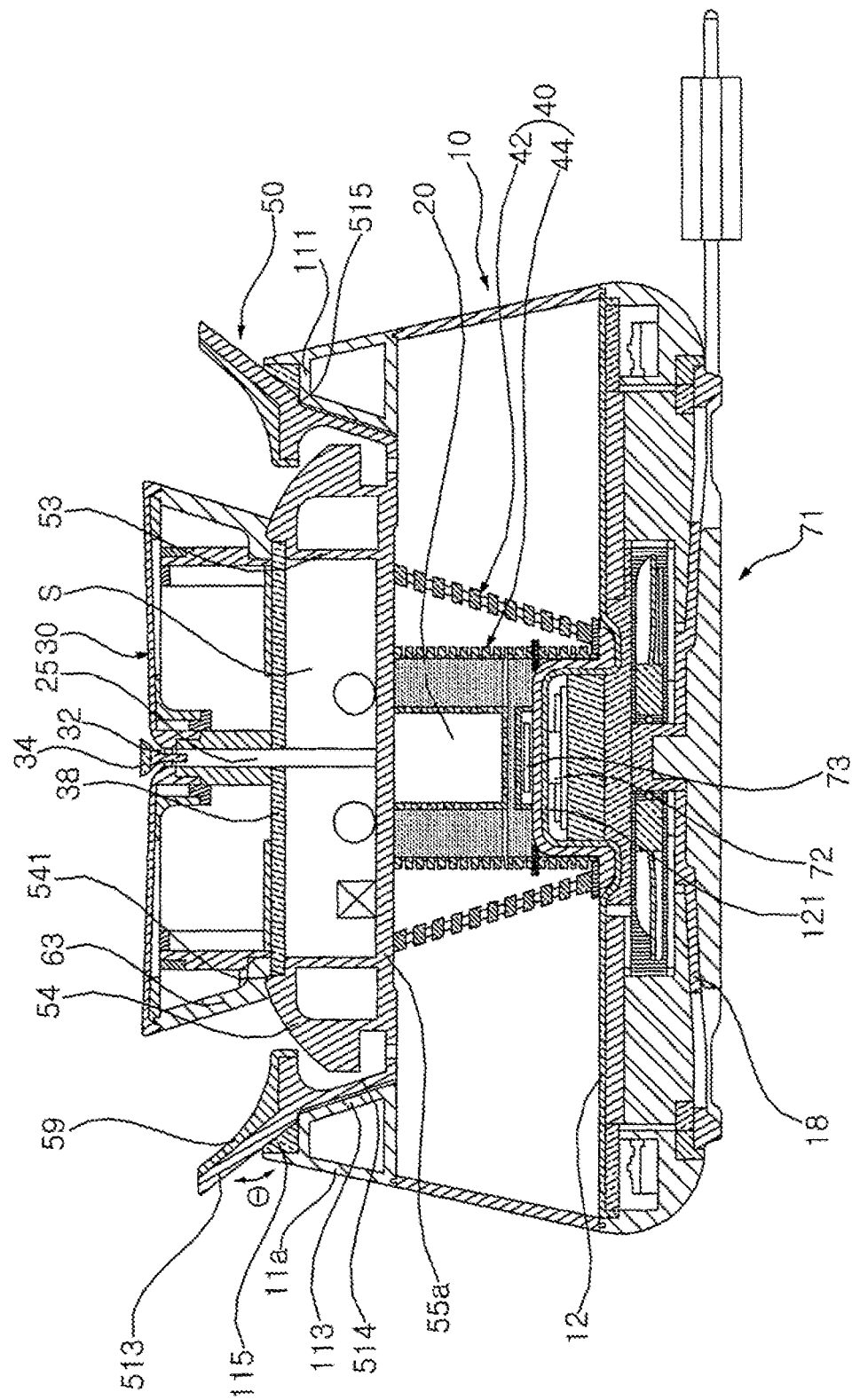
FIG. 8 is a sectional view of a pet water dispenser according to the second embodiment including the water guide shown in FIG. 7.

Referring to FIGS. 7-8, a second embodiment of the water guide 50 may be substantially similar to the first embodiment of the water guide 50 shown in FIGS. 2, 5, and 6 except that a bottom wall 55a may cover an entire lower end of the water guide 50. There may not be a protrusion 551 or opening for the upper filter cover 46, and instead, the bottom wall 55a may replace the upper filter cover 46, or alternatively may be placed on top of an upper filter cover. The bottom wall 55 may be placed on upper ends of the first and second filters 42 and 44. The space S may be defined between the bottom wall 55 on bottom, the partition plate 38 on top, and the first vertical wall 531 at a side.

Figure 9:
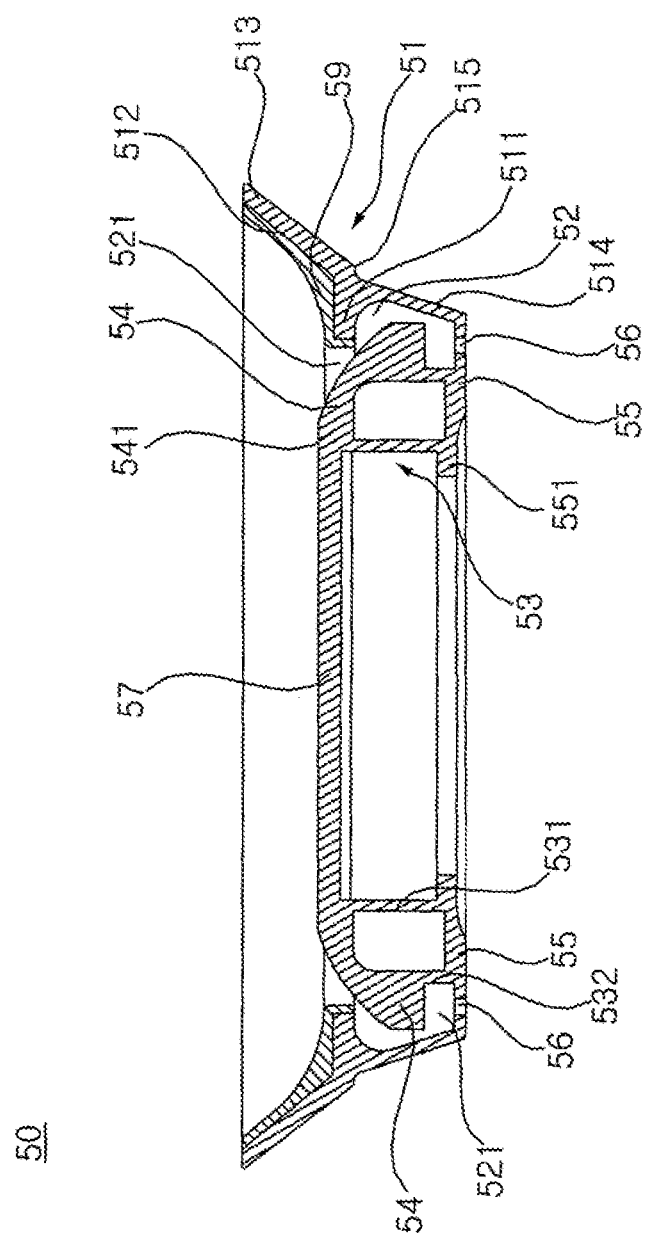
FIG. 9 is a cross-sectional view of a water guide according to a third embodiment.
Figure 10:
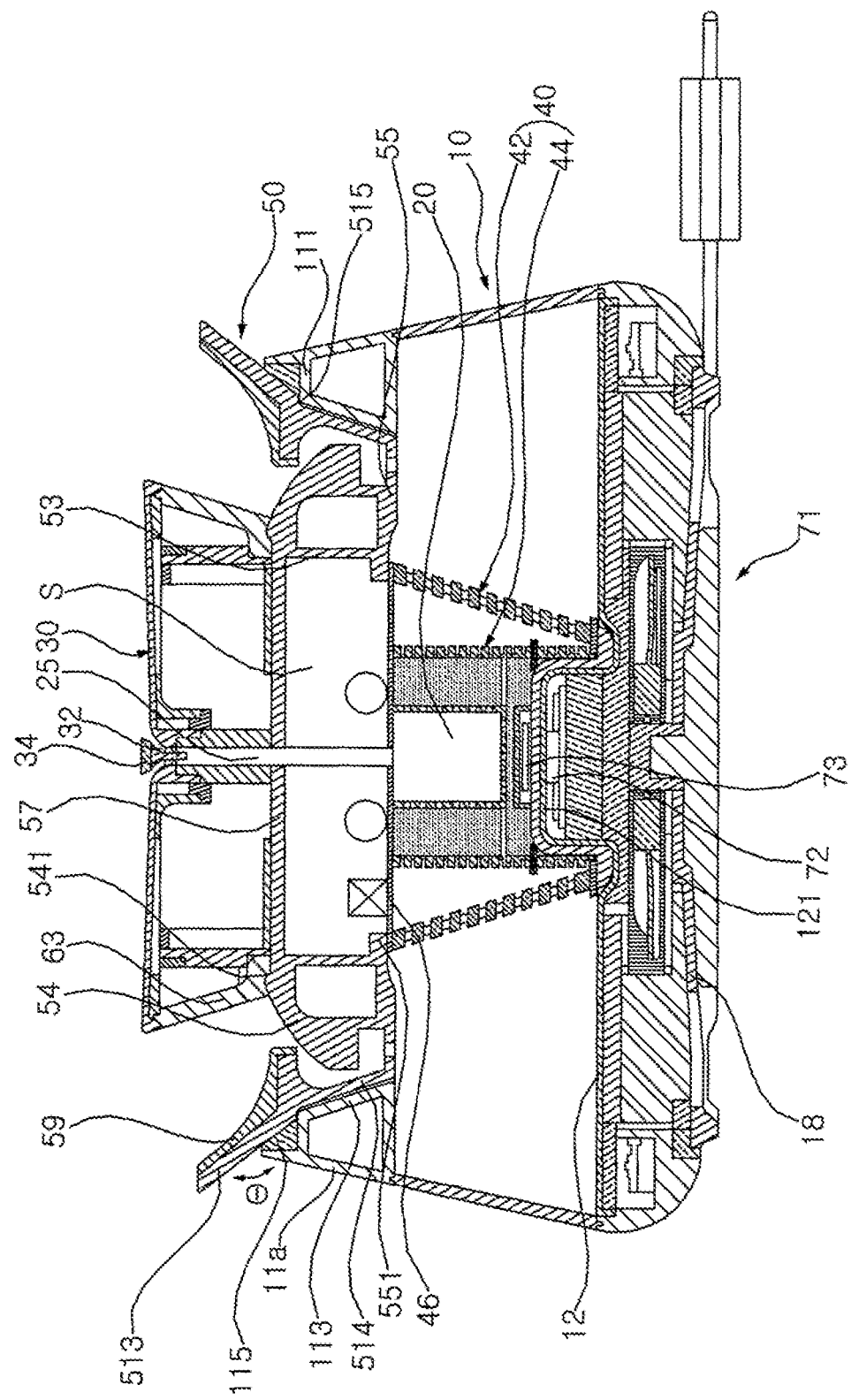
FIG. 10 is a cross-sectional view of a pet water dispenser according to the third embodiment including the water guide shown in FIG. 9.

Referring to FIGS. 9-10, a third embodiment of the water guide 50 may be substantially similar to the first embodiment of the water guide 50 shown in FIGS. 2, 5, and 6 except that an upper cover or wall 57 may extend from the first vertical wall 531 at an inner side of the groove 541 to cover an upper end of the inner wall 53. The upper wall 57 may replace the partition plate 38, or alternatively may support a partition plate placed on top of the upper wall 57. The lower end of the guide 63 may be provided on top of the upper wall 57 within the groove 541, which may be a recess within the upper wall 57. The space S may be defined between the lower filter cover 46 on bottom, the upper wall 57 on top, and the first vertical wall 531 at a side, As can be appreciated by one of ordinary skill in the art, the embodiments shown in FIGS. 7-8 and 9-10 may be combined so that a water guide 50 may be formed to have both a bottom wall 55a that replaces the lower filter cover 46 and an upper wall 57 that replaces the partition plate 38.

In the first through third embodiments of the water guide 50, the water guide 50 may include the lower inclined surface 514, the stepped portion 515, and the upper inclined surface 513, which may not extend from the lower inclined surface 514 due to the stepped portion 515, may be supported on the inner tank wall 113, the first protruding plate 111, and the bumper 115 and the extension 114, respectively. The inner assembly 100 may be firmly and easily installed in the water tank 10 at a predetermined position via the lower filter cover 46, the upper and lower inclines surfaces 513 and 514, and the stepped portion 515. The filter assembly 40, the pump 20, the water supply pipe 25, the water supply plate 30, the illumination assembly 60, and the water guide 50 may be combined or assembled together to form a single inner assembly 100. The inner assembly 100 may be lifted up to be separated or removed from the water tank 10 to facilitate cleaning and reparation.

Figure 11:
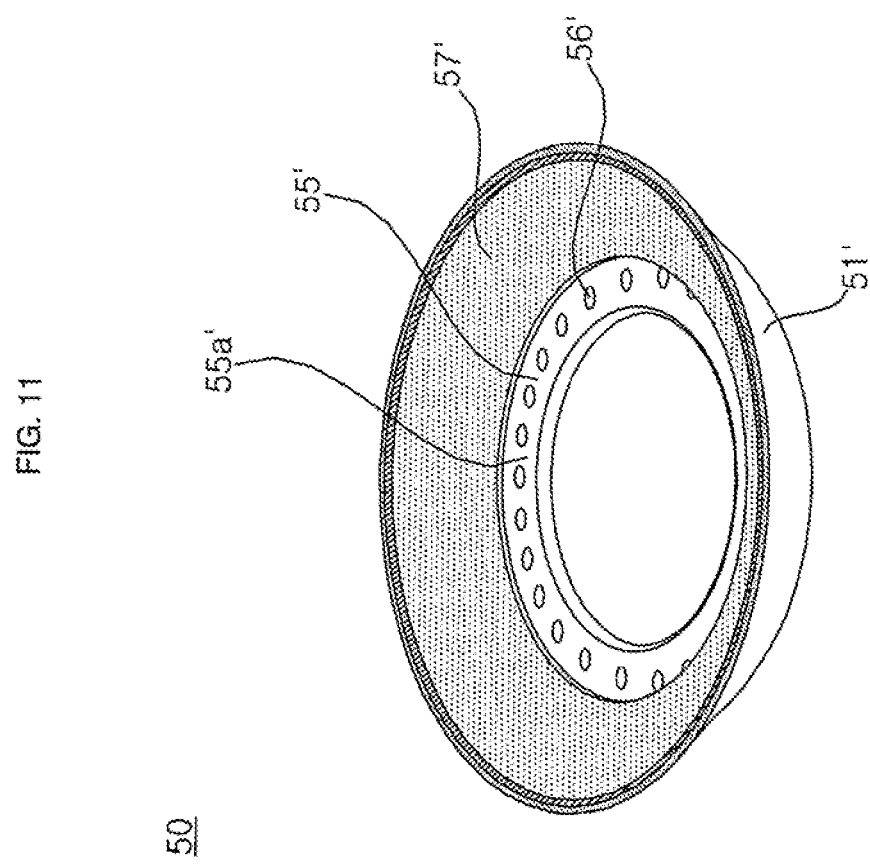
FIG. 11 is a perspective view showing a water guide according to a fourth embodiment.
Figure 13:
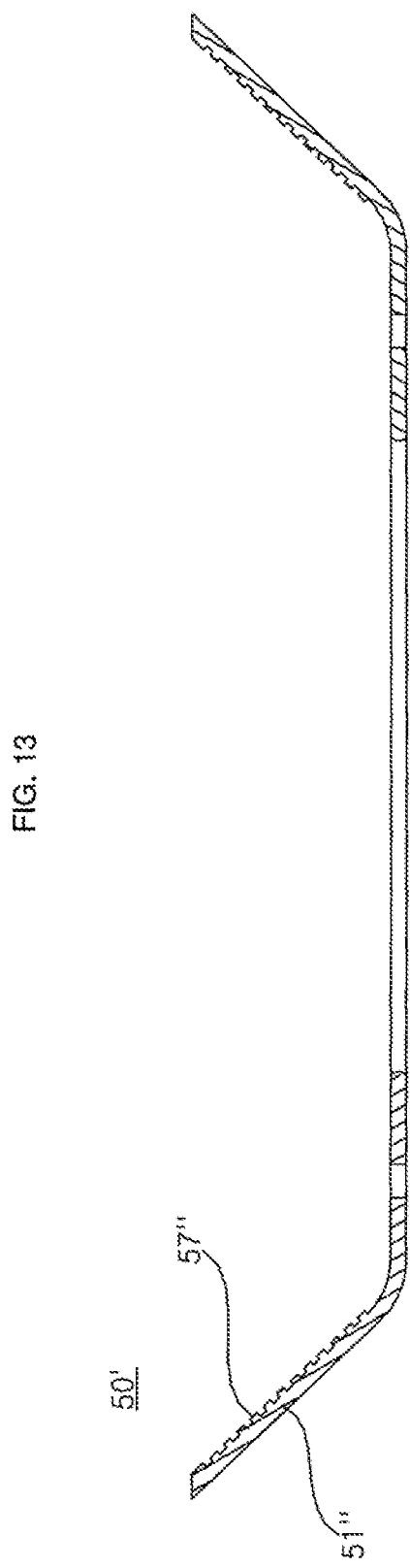
FIG. 13 is a cross-sectional view of a water guide according to a fifth embodiment.
Figure 14:
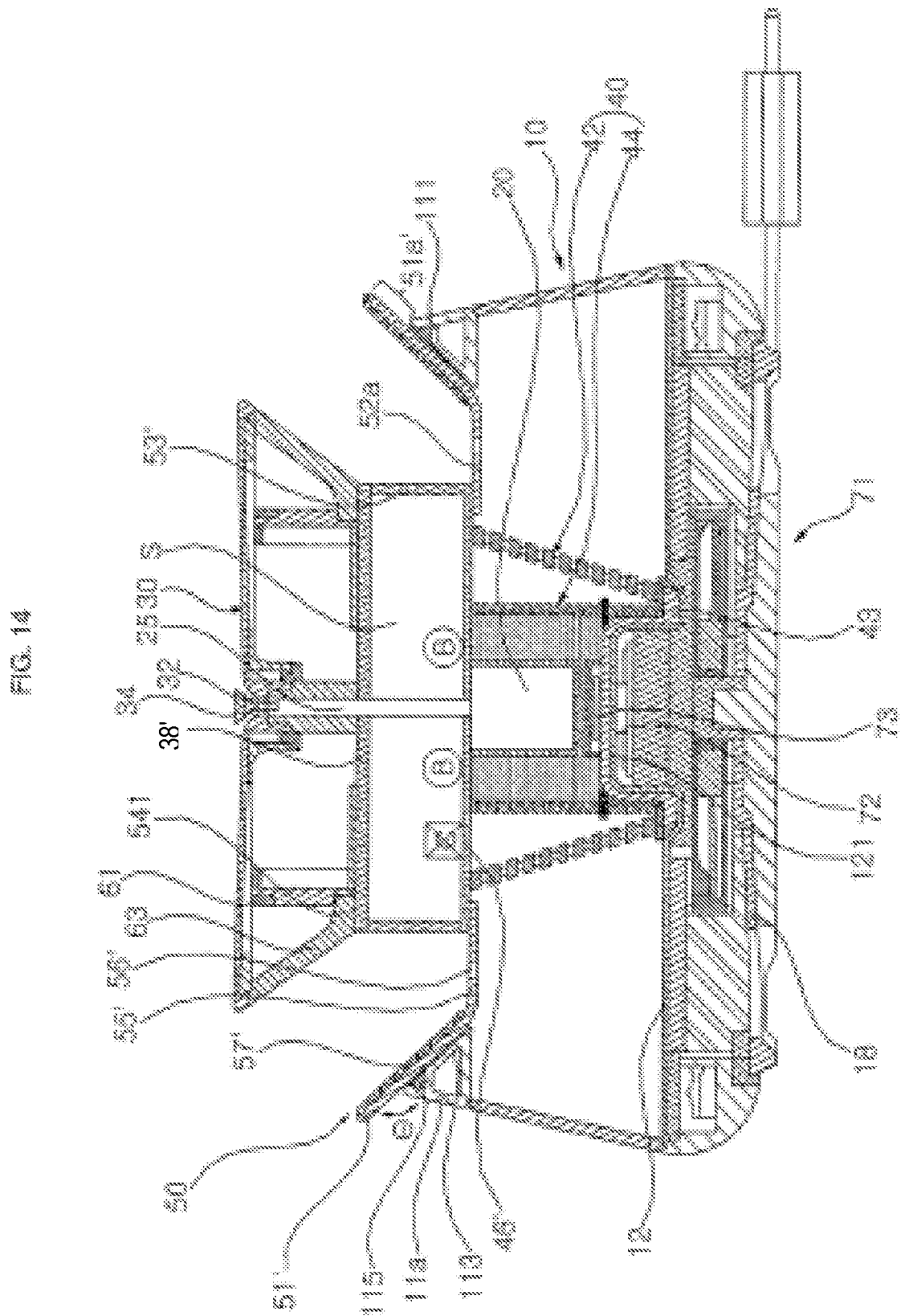
FIG. 14 is a cross-sectional view of a pet water dispenser according to the fourth embodiment.

Referring to FIGS. 11, 13, and 14, a fourth embodiment of the water guide 50 may be similar to the first-third embodiments in that the water guide 50 may be part of an inner assembly 100, and the inner assembly 100 may be easily seated on the water tank 10 by placing the water guide 50 on the upper wall 11a of the water tank 10. Other components of the inner assembly 100 (the filter assembly 40, the pump 20, the water supply pipe 25, the water supply plate 30, and the illumination assembly 60) may be substantially the same as the first-third embodiments exemplified in FIGS. 1-10.

In the fourth embodiment, the water guide 50 may include an outer wall 51' forming an outer side of the water guide 50, and a bottom wall 55' extending horizontally inward from a bottom end of the outer wall 51. The bottom wall 55' may have an inner opening to accommodate the lower filter cover 46.

A discharge hole 56' to discharge or guide the water dropped from the water supply plate 30 back into the water tank 10 may be formed in the bottom wall 55'. There may be a plurality of discharge holes 56' formed in the bottom wall 55' along the circumferential direction.

A coating layer 57' may be coated on an inner surface of the outer wall 51'. The coating layer 57' may be formed of a material different from a material of the water guide 50 to enhance aesthetics and prevent scattering of falling water. As an example, the water guide 50 may be made of plastic or polyvinyl chloride (PVC), and the coating layer 57' may be made of stainless steel or ceramic. The coating layer 57' may be applied over only the inner surface of the outer wall 51', as shown, or alternatively may be applied over an inner surface of the outer wall 51' and an upper surface of the bottom wall 55'. When a water-absorbent material is added to the coating layer 57', a growth of odor and bacteria over a long period of time of the water guide 50 may be prevented.

The outer wall 51' of the water guide may include a protruding portion 51a extending past and upward from the upper wall 11a. A height of the protruding portion 51a of the outer wall 51 may be greater than a height of the upper wall 11a of the water tank 10. A predetermined angle Θ (e.g., 120°) may be formed between the protruding portion 51a and the upper wall 11a so as to catch water falling from the water supply plate 30.

An outer surface of the outer wall 51 may be an inclined surface supported by the inner tank wall 113 of the water tank 10 and also by the extension 114. An inclination of the outer surface of the outer wall 51 may correspond to an inclination of the inner tank wall 114, and the inner assembly 100 may coupled to the water tank 10 via the outer wall 51' of the water guide 50' and the lower filter cover 43 provided on the protrusion 121.

The bottom wall 55' may extend inward, and may have an inner end 55a' configured to support the upper filter cover 46'. An upper filter cover 46' may include walls 53' extending upward from an outer edges of the upper filter cover 46', and the walls 53' may support the partition plate 38'. The upper filter cover 46' may have a truncated cylindrical shell shape, and the space S including the battery B and the controller C may be defined by the upper filter cover 46' at a bottom and side and by the partition plate 38 at a top.

Figure 12:
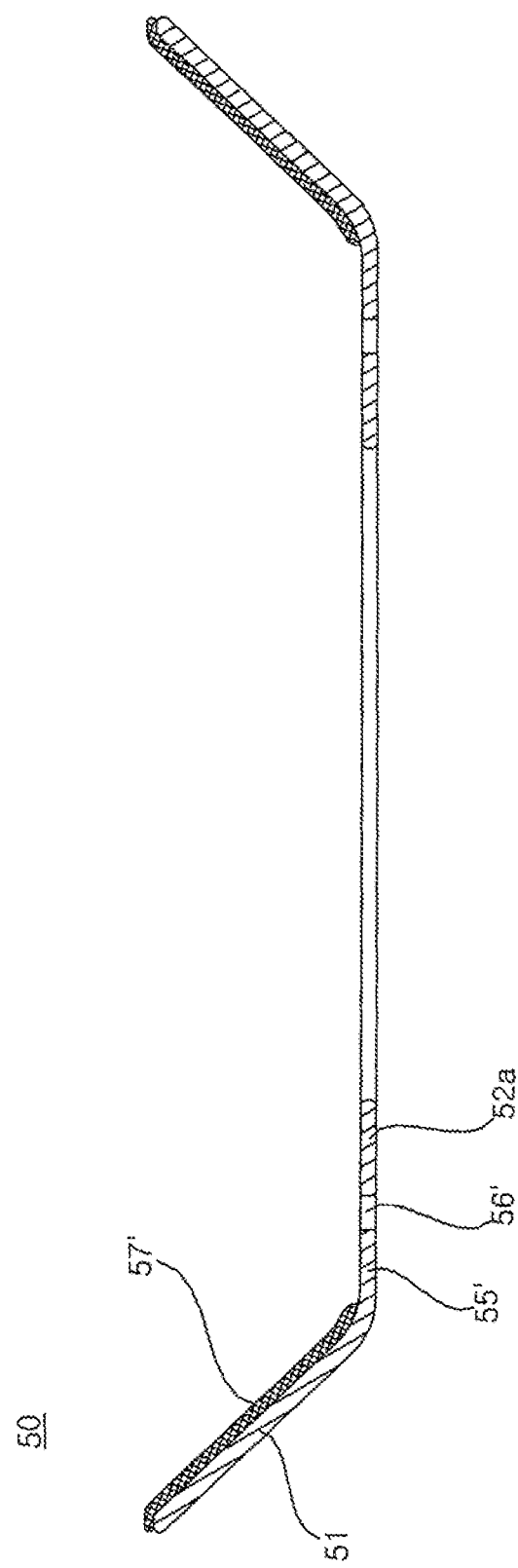
FIG. 12 is a cross-sectional view of FIG. 5.

With reference to FIG. 13, a fifth embodiment of a water guide 50' may be substantially similar as the fourth embodiment exemplified in FIGS. 11, 12, and 14 except that an inner surface 57" of an outer wall 51" may include a plurality of projections and depressions. Light transmitted from the light device 61 (FIG. 14) may be irregularly reflected by the inner surface 57" to attract an animal Shapes, curvatures, and inclinations of the projections and depressions in the inner surface 57" may be configured to prevent scattering and splashing of water dropped from the water supply plate 30.

An inner assembly 100 including the filter assembly 40, the pump 20, the water supply pipe 25, the water supply plate 30, and the illumination assembly 60 may be provided to be removable from the water guide 50, or the upper filter cover 46' may be fixed to the water guide 50' to create a single inner assembly 100 including the water guide 50'. The outer wall 51" of the water guide 50 may be placed on the water tank 10, and the inner assembly 100 may be easily placed on and removed from the water tank 10 to facilitate cleaning and maintenance. The water guide may have a size and shape suitable for a size and habit of a pet, and may be easily replaced.

This application is related to U.S. application Ser. Nos. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,089 filed on September 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, and U.S. application Ser. No. 16/659,841, filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919 and 10-2019-0060920 filed on May 24, 2019; and 10-2019-0080603 and 10-2019-0080604 filed on Jul. 4, 2019.

Embodiments disclosed herein may provide a pet water dispenser capable of substantially expanding or contracting an upper side outer surface of a water tank 10 so as to conform to the size of an animal. Water may not be leaked to an outside of the water tank while the pet is drinking water dropped from a water supply plate.

The pet water dispenser that may always provide clean water to a pet by shielding a space between the water tank and the water supply plate so as to prevent contamination of water in the water tank. The pet may drink water from the pet water dispenser in a comfortable posture. Component parts may be installed in the water tank securely and easily at predetermined positions in the water tank.

A pet water dispenser may include a water tank having an upper opening, a pump installed inside the water tank, a water supply plate provided at a position higher than the water tank and having an upper surface through which water supplied from the pump flows, and a water guide arranged to be spaced apart from the water supply plate and supported by the water tank to guide the water dropped from the water supply plate to the inside of the water tank via a water drain passage.

The water guide may include an upward protruding wall or protruding portion extending upward from an outer wall of the water tank, and the upward protruding wall may be formed to be widened toward the upper side. The water guide may include an inner guide wall spaced inwardly from the outer wall to form a drainage passage with the outer wall, and a bottom wall connecting the outer wall and the lower portion of the inner wall. A hole for discharging the liquid may be formed in the water guide 50.

A guide or guide surface may be inclined downward toward the outer wall on the inner wall, and the outer wall may be formed with an inward protrusion toward the guide so that a narrow drainage path is formed between the outer wall and the guide. The outer wall of the water guide may be formed to have a height higher than that of the inner wall, and an outer inclined surface may be formed on the outer wall to be supported on an inner inclined surface or inner tank wall formed on the wall of the water tank.

As an alternative, the water guide may include an extension protruding upward and outward from the upper side of the water tank. The water guide may include a wall portion or outer wall formed to be inclined from the upper side toward the lower side and a bottom wall portion extending inward from the lower side of the wall portion may be formed. The wall portion of the water guide may be formed with an outer inclined surface supported on an inner inclined surface or inner tank wall formed on the wall of the water tank.

An upper side of the water supply plate may be smoothly formed so that the water supplied from the pump flows along the upper side of the water supply plate and then falls vertically from an edge of the water supply plate into the water guide.

A water supply hole communicating with the water supply pipe may be formed at a center of the water supply plate, and an upper side of the water supply plate may be smoothly formed so that water supplied from the water supply hole flows along the upper side of the water supply plate to be vertically dropped from the edge and introduced into the water guide. The components such as the filter, the pump, a drain pipe, the water supply plate, and the water guide may be combined or assembled into a single inner assembly, or the filter, the pump, a drain pipe, and the water supply plate may be placed on the water guide.

A water guide to receive water flowing down from a water supply plate and to discharge or guide the water to a water tank may be installed or located between the water tank and the water supply plate so as to be detachable from the water tank. The water guide may be formed so as to protrude outward from n upper side of the water tank. The water guide suitable for a certain size of pets may be selected from water guides having various sizes and shapes. The selected water guide may be installed in the water tank so that an outer surface of the water tank may be expanded or reduced.

A water guide may be provided between the water tank and the water supply plate to receive water falling from the water supply plate and to guide or discharge the water to the water tank. An outer wall may be formed to contact a wall of the water tank so that the water dropped from the water supply plate may be recovered into the water tank without leaking to an outside.

Since an outer wall of the water guide may be formed higher than a guide or guide surface of the water guide in which water falling from the water supply plate directly bounces from the water supply plate, the pet may drink water in a comfortable posture. The outer wall of the water guide may be formed to extend outward from the wall of the water tank at a predetermined angle, and water falling from the water supply plate may be prevented from being scattered outside the water tank.

Since the outer wall of the water guide may protrude outward from the wall of the water tank, the water supply plate having a large surface area may be installed so that an edge of the water supply plate from where the water falls may be provided close to the outer wall of the water tank. Water falling from the water supply plate may be easily consumed without contacting the water tank.

Embodiments disclosed herein may prevent contamination of water in the water tank, and may predictably control a temperature and cleanliness of water in the water tank because an upper surface of the water tank is shielded from an outside so that the water tank is thermally insulated. A water tank may be selected among various water tanks to be suitable for a size of an animal so that a pet may drink water falling toward the guide in a comfortable posture in which a head of the may be leaned.

The water guide may extend outwardly from the wall of the water tank at a predetermined angle to prevent water falling from the water supply plate from scattering to an outside of the water tank. Since the water guide may be formed so as to protrude outward from the wall of the water tank, it is possible to position the water supply plate having a large surface area so that an edge of the water supply plate from which the water falls may be close to the outer wall of the water tank. The water falling from the water supply plate may be easily caught by the outer wall of the water tank. Component parts installed in a water tank such as a pump, a water supply plate, etc. may be combined to be a single inner assembly, and the inner assembly may be supported by the water guide so that the inner assembly may be securely positioned.

Embodiments disclosed herein may be implemented as a liquid dispenser comprising a tank having an upper opening defined by an upper end of a wall, a pump installed in the water tank, a pipe through which liquid discharged from the pump may be transferred, a plate provided above the wall of the tank over which liquid supplied from the pipe flows, and a liquid guide provided on and supported by the wall of the water tank. An outer wall of the liquid guide may at least partially protrude upward and outward from the upper end of the wall of the tank.

The liquid guide may include a bottom wall extending inward from a bottom end of the outer wall. At least one hole may be formed in the bottom wall. An angle of 120° may be formed between the wall of the tank and the outer wall of the liquid guide. The wall of the tank may include an inner tank wall that may be inclined outward from a bottom end to a top end. The outer wall of the liquid guide may be supported by the inner tank wall.

A coating layer may be coated on at least a part of an inner surface of the outer wall of the liquid guide. The coating layer may be made of stainless steel. The coating layer may be made of a ceramic material. The coating layer may be made from the same material as a material of the plate.

The inner surface of the outer wall may include a plurality of protrusions and depressions. The pump, the pipe, and the plate form an inner assembly mounted on the liquid guide.

The liquid guide may include an inner wall spaced inward from the outer wall, and a drain passage may be formed between the outer wall and the inner wall. An upper surface of the inner wall may be curved downward toward the outer wall. A height of the upper surface of the inner wall may be lower than a height of the outer wall. A bottom wall may connect the outer wall and the inner wall. The bottom wall may include at least one hole to discharge liquid passing through the drain passage into the tank. The inner wall may include first and second vertical walls connecting the upper surface of the inner wall and the bottom wall. A lower portion of the upper surface of the inner wall may protrude outward from the second vertical wall toward the outer wall.

The wall of the tank may include an inner tank wall that may be inclined outward from a bottom end to a top end. The outer wall of the liquid guide may have upper and lower inclined surfaces separated by a stepped portion. The lower inclined surface may be supported by the inner tank wall.

A filter assembly may be provided inside the tank to filter liquid in the tank. The filter assembly, the pump, the pipe, the plate, and the liquid guide may form an inner assembly mounted on the wall of the tank.

The liquid guide may include a bottom wall defining a bottom surface of the liquid guide. The bottom wall may cover a top end of the filter assembly.

The liquid guide may include a bottom wall defining a bottom surface of the liquid guide. The filter assembly may include an upper filter cover that may be inserted into an inner opening of the bottom wall of the liquid guide.

The liquid guide may include an upper wall defining an upper surface of the liquid guide. The plate may be provided above the upper wall.

It will be understood that when an element or layer is referred to as being "on" another element or layer, the element or layer may be directly on another element or layer or intervening elements or layers, in contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" may encompass both an orientation of above and below. The device may be otherwise oriented (rotated 90 degrees or at other orientations) and the spatially relative descriptors used herein interpreted accordingly, The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank having an upper opening defined by an upper end of a wall;
   a pump installed in the
   a pipe through which liquid discharged from the pump is transferred;
   a plate provided above the wall of the tank over which liquid supplied from the pipe flows; and,
   a liquid guide provided on and supported by the wall of the water tank, wherein an outer wall of the liquid guide at least partially protrudes upward and outward from the upper end of the wall of the tank,
   wherein the liquid guide includes an inner wall spaced inward from the outer wall, and a drain passage is formed between the outer wall and the inner wall, and
   wherein an upper surface of the inner wall is curved downward toward the outer wall.

2. The liquid dispenser of claim 1, wherein the liquid guide includes a bottom wall extending inward from a bottom end of the outer wall.

3. The liquid dispenser of claim 2, wherein at least one hole is formed in the bottom wall.

4. The liquid dispenser of claim 1, wherein an angle of 120° is formed between the wall of the tank and the outer wall of the liquid guide.

5. The liquid dispenser of claim 1, wherein the wall of the tank includes an inner tank wall that is inclined outward from a bottom end to a top end, and the outer wall of the liquid guide is supported by the inner tank wall.

6. The liquid dispenser of claim 1, wherein a coating layer is coated on at least a part of an inner surface of the outer wall of the liquid guide.

7. The liquid dispenser of claim 6, wherein the coating layer is made of stainless steel.

8. The liquid dispenser of claim 6, wherein the coating layer is made of a ceramic material.

9. The liquid dispenser of claim 6, wherein the coating layer is made from the same material as a material of the plate.

10. The liquid dispenser of claim 6, wherein the inner surface of the outer wall includes a plurality of protrusions and depressions.

11. The liquid dispenser of claim 1, wherein the pump, the pipe, and the plate form an inner assembly mounted on the liquid guide.

12. The liquid dispenser of claim 1, wherein a height of the upper surface of the inner wall is lower than a height of the outer wall.

13. The liquid dispenser of claim 1, further including a bottom wall connecting the outer wall and the inner wall, wherein the bottom wall includes at least one hole to discharge liquid passing through the drain passage into the tank.

14. The liquid dispenser of claim 13, wherein the inner wall includes first and second vertical walls connecting the upper surface of the inner wall and the bottom wall.

15. The liquid dispenser of claim 14, wherein a lower portion of the upper surface of the inner wall protrudes outward from the second vertical wall toward the outer wall.

16. The liquid dispenser of claim 1, wherein the wall of the tank includes an inner tank wall that is inclined outward from a bottom end to a top end, the outer wall of the liquid guide has upper and lower inclined surfaces separated by a stepped portion, and the lower inclined surface is supported by the inner tank wall.

17. The liquid dispenser of claim 1, further including a filter assembly provided inside the tank to filter liquid in the tank, wherein the filter assembly, the pump, the pipe, the plate, and the liquid guide form an inner assembly mounted on the wall of the tank.

18. The liquid dispenser of claim 17, wherein the liquid guide includes a bottom wall defining a bottom surface of the liquid guide, and the bottom wall covers a top end of the filter assembly.

19. The liquid dispenser of claim 17, wherein the liquid guide includes a bottom wall defining a bottom surface of the liquid guide, and the filter assembly includes an upper filter cover that is inserted into an inner opening of the bottom wall of the liquid guide.

20. The liquid dispenser of claim 1, wherein the liquid guide includes an upper wall defining an upper surface of the liquid guide, and the plate is provided above the upper wall.

* * * * *